United States Patent
Ruga

(10) Patent No.: US 9,740,215 B2
(45) Date of Patent: Aug. 22, 2017

(54) THERMOSTATIC MIXING VALVE WITH INTEGRATED FLOW DIVERTER

(76) Inventor: Manolo Ruga, Gozzano NO (IT)

(*) Notice: Subject to any disclaimer, the term of this patent is extended or adjusted under 35 U.S.C. 154(b) by 381 days.

(21) Appl. No.: 13/996,284

(22) PCT Filed: Dec. 22, 2011

(86) PCT No.: PCT/IB2011/055886
§ 371 (c)(1),
(2), (4) Date: Aug. 7, 2013

(87) PCT Pub. No.: WO2012/085873
PCT Pub. Date: Jun. 28, 2012

(65) Prior Publication Data
US 2013/0334324 A1    Dec. 19, 2013

(30) Foreign Application Priority Data
Dec. 22, 2010   (IT) .............................. MI2010A2359

(51) Int. Cl.
| | |
|---|---|
| *G05D 23/12* | (2006.01) |
| *G05D 23/185* | (2006.01) |
| *F16K 11/074* | (2006.01) |
| *F16K 31/00* | (2006.01) |
| *G05D 11/16* | (2006.01) |

(52) U.S. Cl.
CPC ........ G05D 23/1858 (2013.01); F16K 11/074 (2013.01); F16K 31/002 (2013.01); G05D 11/16 (2013.01)

(58) Field of Classification Search
CPC .. G05D 23/1858; G05D 11/16; F16K 11/074; F16K 31/002
See application file for complete search history.

(56) References Cited

U.S. PATENT DOCUMENTS

| | | | |
|---|---|---|---|
| 5,340,018 A * | 8/1994 | MacDonald | 236/12.2 |
| 2003/0101510 A1 | 6/2003 | Ottelli | |
| 2007/0152075 A1* | 7/2007 | Ruga et al. | 236/12.2 |

FOREIGN PATENT DOCUMENTS

| | | |
|---|---|---|
| DE | 10133036 A1 | 1/2003 |
| EP | 1 486 623 A1 | 12/2004 |

OTHER PUBLICATIONS

International Search Report of PCT/IB2011/055886 dated Mar. 30, 2012.

* cited by examiner

*Primary Examiner* — Justin Jonaitis
*Assistant Examiner* — Larry Furdge
(74) *Attorney, Agent, or Firm* — Lucas & Mercanti, LLP

(57) ABSTRACT

The invention relates to a thermostatic mixing valve with integrated flow diverter provided with a first coupling for a control lever for the flow rate adjustment and the flow diversion through a valve group that is housed between a base and a cylindrical body, and with a second coupling for a knob for the temperature adjustment through a thermostatic device, said valve including a member for the transmission of the flow rate adjustment and flow diversion control that directly connects the control lever to the valve group passing through the cylindrical body without moving it, the latter being also enclosed within an external casing secured to the base and achieving a watertight sealing with the base.

7 Claims, 5 Drawing Sheets

THERMOSTATIC MIXING VALVE WITH INTEGRATED FLOW DIVERTER

CROSS REFERENCE TO RELATED APPLICATION

This Application is a 371 of PCT/IB2011/055886 filed on Dec. 22, 2011, which claimed the priority of Italian Patent Application No. MI2010A002359 filed on Dec. 22, 2010, both applications are incorporated herein by reference in their entirety.

The present invention relates to valves for mixing hot and cold water in sanitary facilities (wash-basins, showers, bath-tubs, etc.), and in particular to a cartridge mixing valve provided with a flow diverter suitable to direct the flow of water towards two or more different outlets.

It is known that conventional single-control mixing taps include a tap body with a cartridge mixing valve (hereinafter simply valve) removably inserted therein and a control lever for controlling a valve group, within the cartridge, made up of a pair of ceramic disks which adjust the flow of hot and cold water. This adjustment of the water, both in flow rate and in temperature, is carried out through the translation and rotation, respectively, of a mobile disk over an underlying fixed disk. In this way, the extent of aperture of the ports formed in said disks for the passage of hot and cold water is changed, and so is the ratio between hot water and cold water when they are mixed prior to the conveying to the tap mouth.

In order to maintain a constant temperature of the delivered water, both between two tap openings and during a same opening, it is possible to incorporate a thermostatic device in a conventional tap. Such a device acts downstream from the valve group by controlling the inflow of hot and cold water into the mixing chamber through respective ports by means of a thermosensitive bulb which causes the shifting of a slider suitable to change the aperture of said ports in the mixing chamber.

These known thermostatic valves are used also in showers and bath-tubs where the mixed water can be directed towards two or more different outlets by means of a flow diverter that forms a separate unit with respect to the valve. The presence of a separate diverter obviously implies a higher cost and bulkiness of the hydraulic group intended to adjust and distribute the water, whereby it is preferable that such a diverter is integrated in the thermostatic valve.

An example of such a thermostatic valve provided with an integrated flow diverter is disclosed in US 2003/0101510A1, but the solution illustrated therein still has some drawback of various kinds. In fact, this known valve essentially consists of a cylindrical body that houses a conventional thermostatic device and is provided on its lateral surface with two inlets for the inflow of hot and cold water as well as three seats for gaskets to achieve a watertight sealing with the housing where the valve is introduced.

The temperature is adjusted by means of a top knob connected to the thermostatic device through an internal rod, as in conventional thermostatic valves. The adjustment of the flow rate of mixed water and the diversion of the flow towards one of two different outlets is achieved by means of a valve group arranged under the cylindrical body, in a base secured to the housing, and comprising a mobile upper disk having one opening and a fixed lower disk having two openings.

The control of the flow rate and of the flow diversion is performed by the user through a lever, located under the temperature control knob, which transmits the command to the valve group through a sleeve screwed onto the cylindrical body which in turn engages the mobile disk located at the top of the valve group.

In this way, the flow rate adjustment and the flow diversion control take place at the valve outlet, i.e. downstream from the mixing chamber where the temperature is adjusted, contrarily to conventional thermostatic valves without diverter where the flow rate adjustment takes place at the valve inlet.

A first serious drawback of the above-described valve resides in the fact that since the cylindrical body must rotate within its housing to transmit the flow rate adjustment and flow diversion control, the three gaskets on the external surface thereof must achieve a dynamic watertight sealing that causes their rapid wear and reduces the valve reliability.

Moreover, the sleeve and the cylindrical body that make up the command transmission chain from the lever to the upper disk are locked in the case by a top ring nut that firmly presses them against the base of the valve group to resist the pressure of the inflowing water, since the whole valve is constantly under pressure in that the flow stopping takes place at the valve outlet. As a consequence, the flow rate control lever can become very "hard" to rotate due to the high pressure exerted on the members connected thereto.

A further significant drawback stems from the fact that since the watertight sealing is achieved between the cylindrical body and the housing of the shower/bath-tub in which the thermostatic valve is introduced, the latter can only be used in showers/bath-tubs provided with such a case. In other words, due to the shape restraint between the valve and its housing there is no possibility of a "universal" use of the valve in any shower/bath-tub having a housing sufficiently large to receive it because it is necessary to adapt the shape of the housing or, even worse, of the cylindrical body of the valve in order to achieve the required shape matching.

Still another drawback derives from the fact that the rotation of the cylindrical body also implies the rotation of the flow rate and temperature controls secured at the top thereof with respect to the fixed housing. As a consequence, the user may be confused by the fret that also the position of the temperature control changes with the flow rate adjustment, although the temperature adjustment does not change.

Another example of a thermostatic valve provided with an integrated flow diverter is disclosed in EP 1486623 A1, but also the solution illustrated therein still has some drawbacks of various kinds. In fact this known valve substantially consists of a conventional cartridge thermostatic valve, in which the flow rate adjustment takes place at the valve inlet, that is also provided with a separate lever for the flow diversion through a specific mobile third disk that makes part of the valve group.

This implies the presence of several additional members that make the valve bulkier, more expensive and less reliable. Moreover, the sleeve that acts as command transmission chain from the diverting lever to the mobile third disk must overcome a strong friction since it is locked in the cartridge body by a top lid that firmly presses it towards the cartridge base to resist the pressure of the inflowing water. Furthermore, in this solution the flow rate adjustment implies the rotation of the whole thermostatic device that thus undergoes a stress even in the absence of temperature adjustment.

A further example of a thermostatic valve provided with an integrated flow diverter is disclosed in DE 10133036 A1, but also the solution illustrated therein still has some drawbacks of various kinds. Also this known valve substantially consists of a conventional cartridge thermostatic valve, in which the flow rate adjustment takes place at the valve inlet, but provided with a single control for the flow diversion and the flow rate adjustment of the mixed water.

Though achieving this double function without adding a separate lever or a third disk to the valve group, however this valve provides the presence of a complicated command transmission system with a gear train comprising a double pinion shaft, which implies the presence of several additional members that make the valve bulkier, more expensive and less reliable. Moreover, its use is rather inconvenient since the diversion towards the various outlets can take place only sequentially, whereby the user in order to direct the water for example to the second (or third) outlet must previously have it delivered through the first (or first and second) outlet.

Therefore the object of the present invention is to provide a thermostatic mixing valve with integrated flow diverter suitable to overcome the above-mentioned drawbacks.

This object is achieved by means of a valve in which the flow rate adjustment and the flow diversion control are performed through a member directly connecting the lever moved by the user to the valve group, said member passing through the cylindrical body without moving it, the cylindrical body being further enclosed by an external casing that encloses almost all the valve members.

A first important advantage of the present valve is that of avoiding the rotation of the cylindrical body when the flow rate adjustment lever is moved, whereby there are no gaskets on the outside of the cylindrical body that must achieve a dynamic watertight sealing and wear out rapidly. Furthermore, in this way, the flow rate control always remains "soft" and easy to move since it acts directly on the valve group without having to drag along other members pressed by the lock ring nut and therefore does not need to overcome strong frictions. Moreover, the flow rate and temperature controls are completely independent of each other whereby the flow rate adjustment does not cause the shifting of the temperature control.

A second significant advantage of this valve stems from the fact that the double function of flow diversion control and flow rate adjustment of the mixed water is performed through few members of simple shape, which results in less bulkiness, lower cost and higher reliability.

These and other advantages and characteristics of the valve according to the present invention will be clear to those skilled in the art from the following detailed description of an embodiment thereof, with reference to the annexed drawings wherein.

Figure 1A:
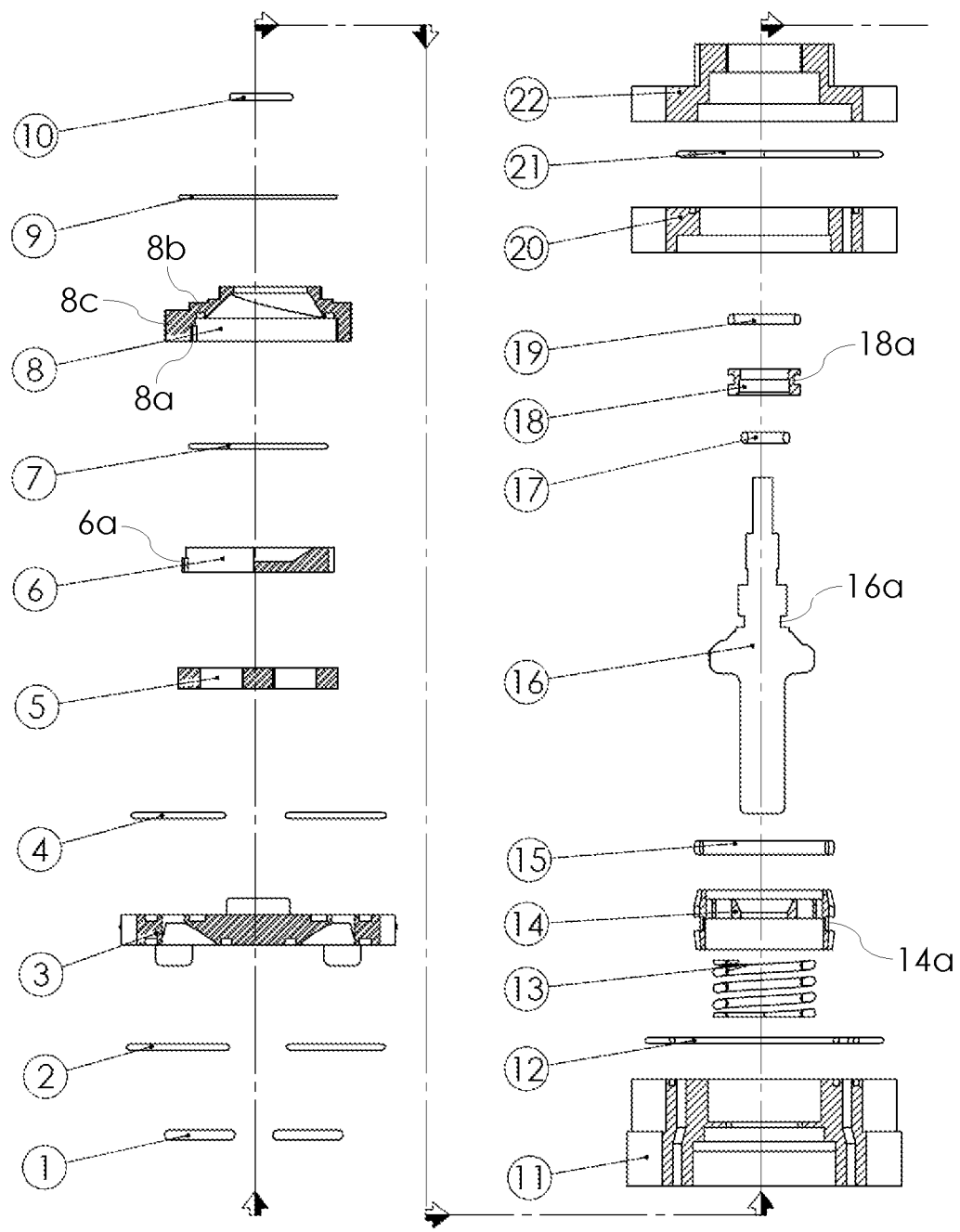
FIGS. 1a-1b are exploded side views of the members which make up the above-mentioned valve, some of them being partially sectioned and others sectioned.
Figure 1B:
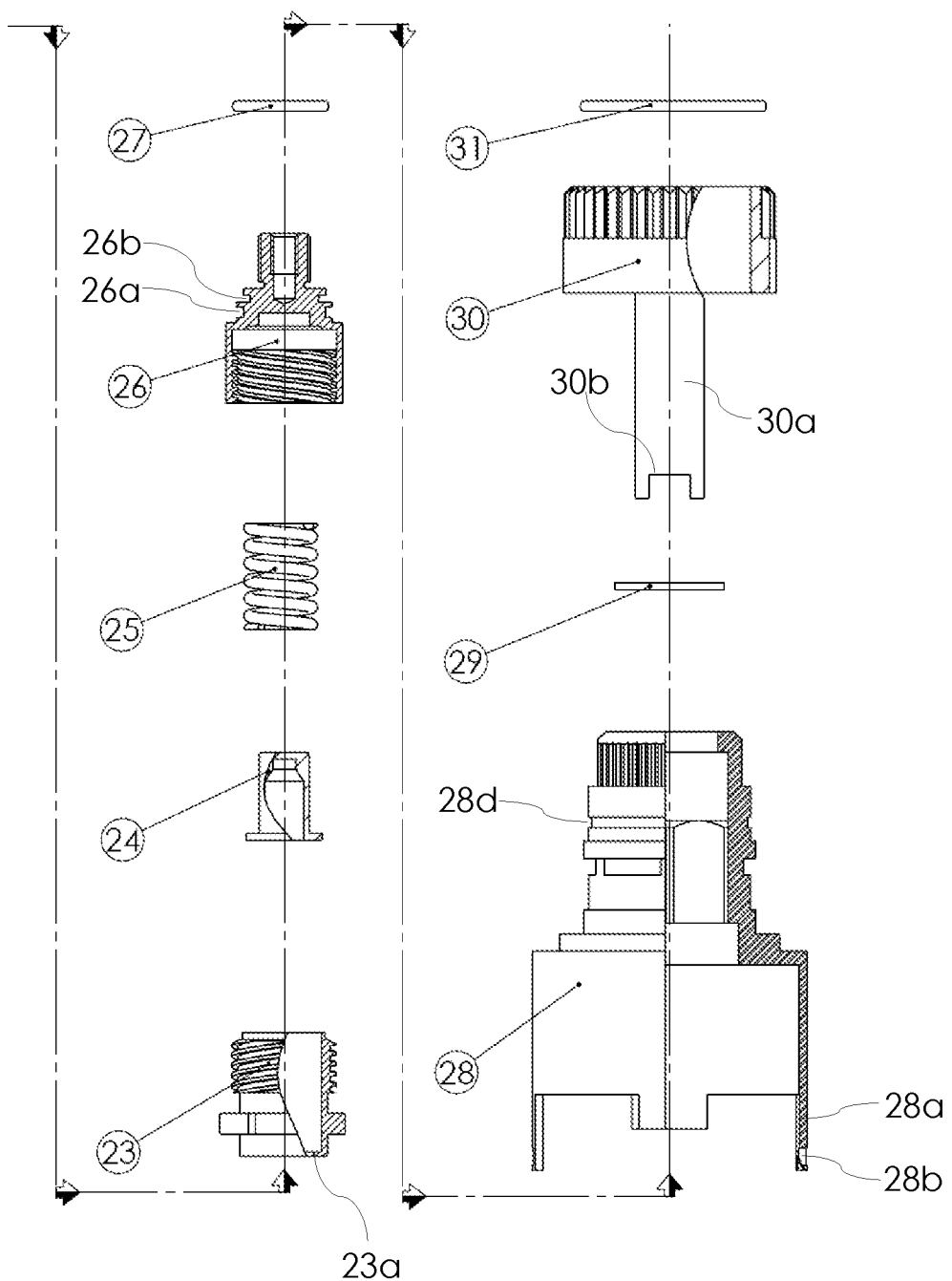
Figure 2:
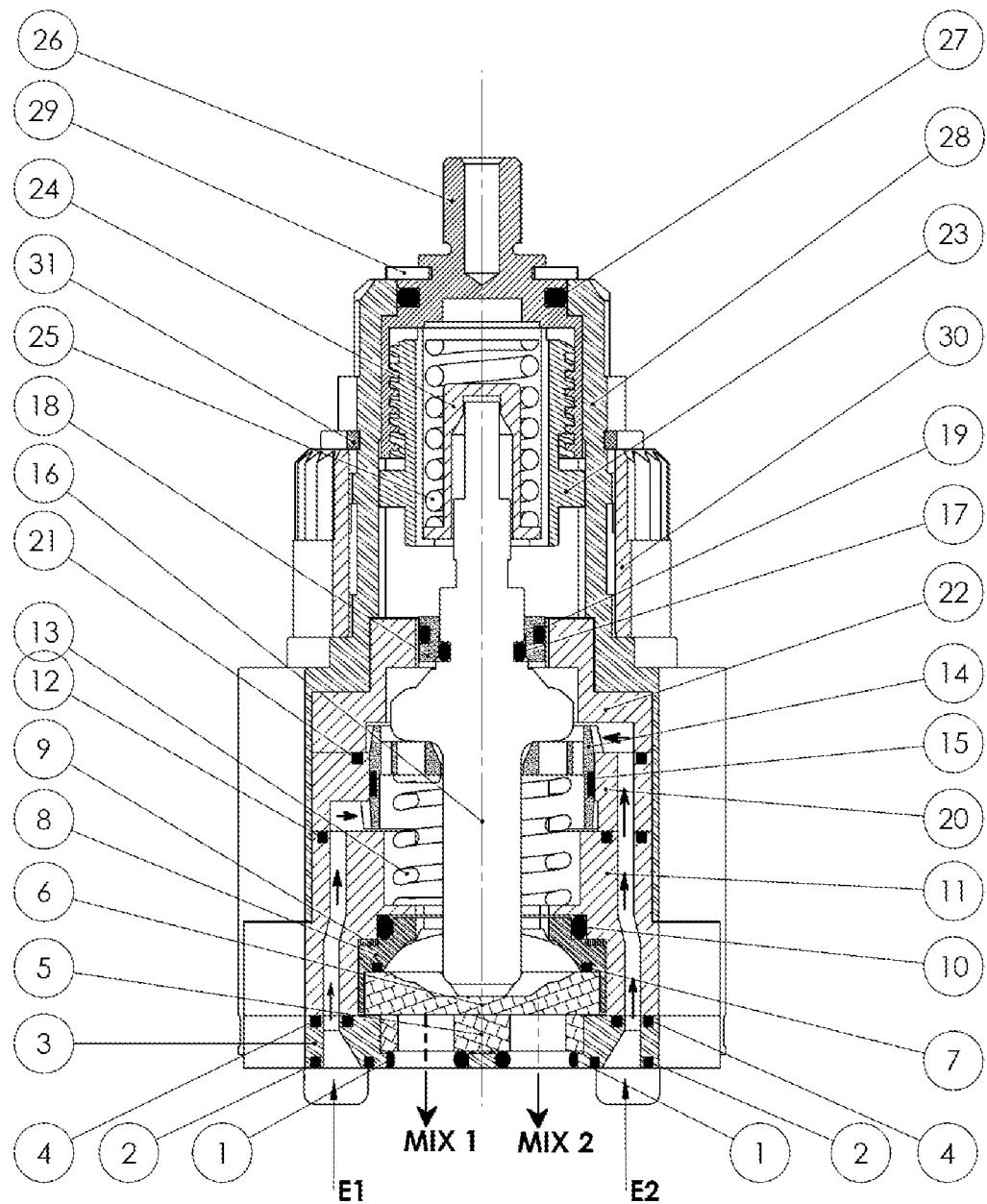
FIG. 2 is a schematic sectional side view showing the members of FIGS. 1a and 1b in an assembled state.
Figure 3:
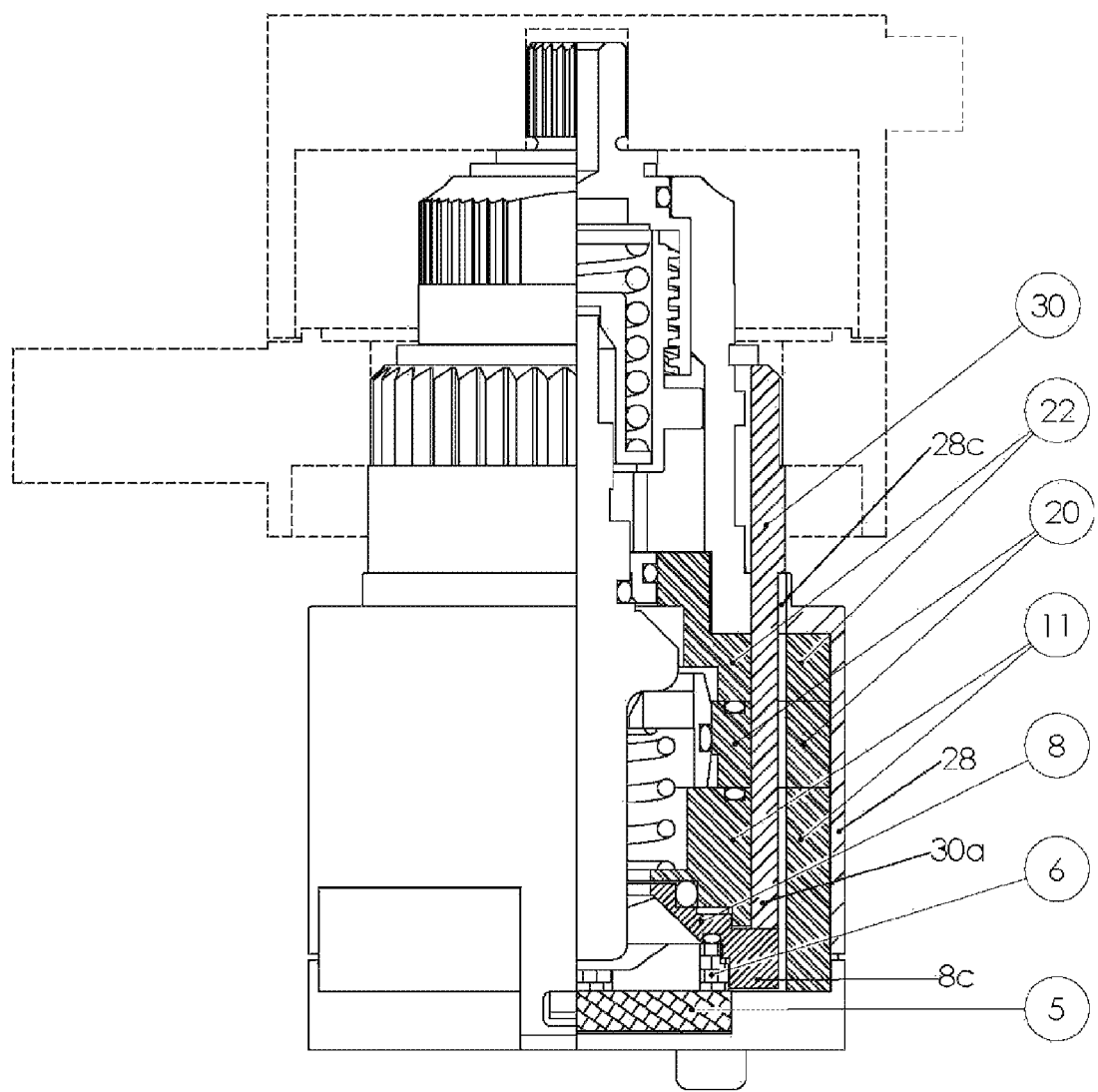
FIG. 3 is a partially sectional schematic side view, along a plane substantially perpendicular to the sectional plane of FIG. 2, showing the detail of the direct connection between the flow rate control and the valve group.

With reference to FIGS. 1 to 3, there is seen that a valve according to the present invention includes a valve group, described in greater detail further on, that is housed partly in a base 3 and partly in a cylindrical body 11, which is enclosed by an external casing 28 secured to base 3 through at least a pair of tabs 28a extending downwards from the casing 28 and provided with openings 28b that engage corresponding locking teeth formed on the peripheral side of base 3. In this way, the cylindrical body 11 is enclosed by the external casing 28 and achieves a watertight sealing with base 3 according to a first novel aspect of the invention.

In base 3 there are formed two outermost openings E1, E2 for the inflow of hot and cold water, respectively, and two innermost openings MIX1 and MIX2 for the outflow of the mixed water towards two different users, for example to a shower head or a hand shower. On the bottom side of base 3 there are formed the seats for housing the gaskets that achieve the watertight sealing for the mounting in the shower/bath-tub housing, namely a pair of O-rings 1 for the MIX1 and MIX2 outlets and a pair of O-rings 2 for the E1, E2 inlets.

Similar O-rings 4 achieving the watertight sealing between base 3 and cylindrical body 11 are arranged in seats formed on the top side of base 3, where there is also formed a central seat intended to receive a fixed lower disk 5 of the valve group. Said fixed lower disk 5 has two openings at the outlets MIX1, MIX2 of base 3 and the flow diversion towards either of the two outlets or the total closure of the valve are performed by means of a mobile upper disk 6 having a single opening, as better illustrated further on.

The two disks 5, 6 are made of ceramic material whereas the other members with which they are in contact are made of a softer material, such as typically plastic or brass, whereby the rotation of the mobile disk 6 could cause a problem of wear of the softer material. In order to prevent such a wear problem, the mobile disk 6 is preferably not moved directly by the flow rate control but it is received in a drawing member 8 with respect to which it is rotationally restrained by means of a peripheral tooth 6a engaging a corresponding seat 8a formed in the bottom of the drawing member 8.

An O-ring 7 housed in a respective seat 8b achieves the sealing between the mobile disk 6 and the drawing member 8, which is also provided with a peripheral projection 8c that is engaged by a flow rate command transmission member 30 through a vertical stem 30a provided at its bottom end with a corresponding recess 30b, as better illustrated further on.

The drawing member 8 is in turn received in the cylindrical body 11 with the interposition of an anti-friction ring 9 and an O-ring 10, and the cylindrical body 11 is finally received in casing 28 as mentioned above. On top of the cylindrical body 11 there are sequentially arranged a first additional body 20, comprising a hot water chamber and a supply passage for cold water, as well as a second additional body 22 comprising a cold water chamber. Gaskets 12, 21 are arranged in corresponding seats toned at suitable positions respectively on the top side of the cylindrical body 11 and of the first additional body 20, so as to achieve a static watertight sealing between said two bodies 11, 20 and between the latter and the second additional body 22 with respect to the hot and cold water entering through openings E1 and E2.

The further members indicated by reference numerals 13 to 27 make up a conventional thermostatic device that is briefly described hereunder.

A thermostatic member 16 is inserted from above through a disk-shaped perforated slider 14, provided with a relevant external O-ring 15 received in a seat 14a, and the whole is inserted together with a lower spring 13 into bodies 11, 20, 22 such that the bulb at the bottom end of the thermostatic member 16 extends into the drawing member 8. A small slide brace 18 is mounted on the top portion of the thermostatic member 16, with the interposition of an O-ring 17 received in a seat 16a, and introduced in a top opening of the second additional body 22 with the interposition of an external O-ring 19 received in a seat 18a.

In this way, the second additional body 22 acts also as a guide for the vertical movement of the thermostatic member 16 and as a plug for the cylindrical body 11, in collaboration with the above-mentioned members 12 and 17-21, such that the top portion of the valve is not subjected to the water pressure.

The temperature adjustment is carried out through a so-called "stud" 23 housing a spring 25 that pushes on a cap 24 retained inside stud 23 by an internal bottom rim 23a of the latter. Cap 24 receives the top end of the thermostatic member 16 and limits the travel thereof, the position of cap 24 being defined by stud 23 that is provided with an external thread engaging a corresponding internal thread of a calotte 26 provided at the top with a socket for the mounting of the temperature control knob (not illustrated).

This calotte 26 is in turn received in the external casing 28, with the interposition of an external O-ring 27 received in a seat 26a, such that said temperature control socket projects at the top of the valve. A Seeger ring 29 received in a seat 26b formed in the projecting portion of calotte 26 provides a rotatable locking of the latter on the external casing 28, which also carries the reference ring (not illustrated) with the temperature scale.

As previously mentioned, another novel aspect of the valve according to the present invention is the flow rate command transmission member 30 that through the vertical stem 30a directly engages the valve group, and in particular the drawing member 8, passing through the cylindrical body 11 and the additional bodies 20, 22 without moving them. To this purpose, said member 30 is externally fitted on the external casing 28, which has a slot 28c for the passage of stem 30a, and is rotatably locked thereon by a Seeger ring 31 received in a seat 28d. The lever for the flow rate adjustment and the flow diversion control, not illustrated, is mounted on member 30 at the grooved surface thereof.

It should be noted that once members 4-27 are introduced into casing 28 through the bottom thereof, the locking of base 3 on casing 28 achieves the complete sealing of the valve which results watertight regardless of the housing where it is introduced.

Therefore the top ring nut (not illustrated) that firmly presses the valve against the base of its housing to resist the pressure of the inflowing water can abut on the top edge of the external casing 28 without this increasing the frictions inside the valve. In fact, member 30, in order to rotate the mobile disk 6, just has to overcome the friction of its own rotation on casing 28, of the drawing member 8 inside the cylindrical body 11 and of the mobile disk 6 on the fixed disk 5 which are all frictions of a very small amount.

Figures 4A, 4B, 4C:
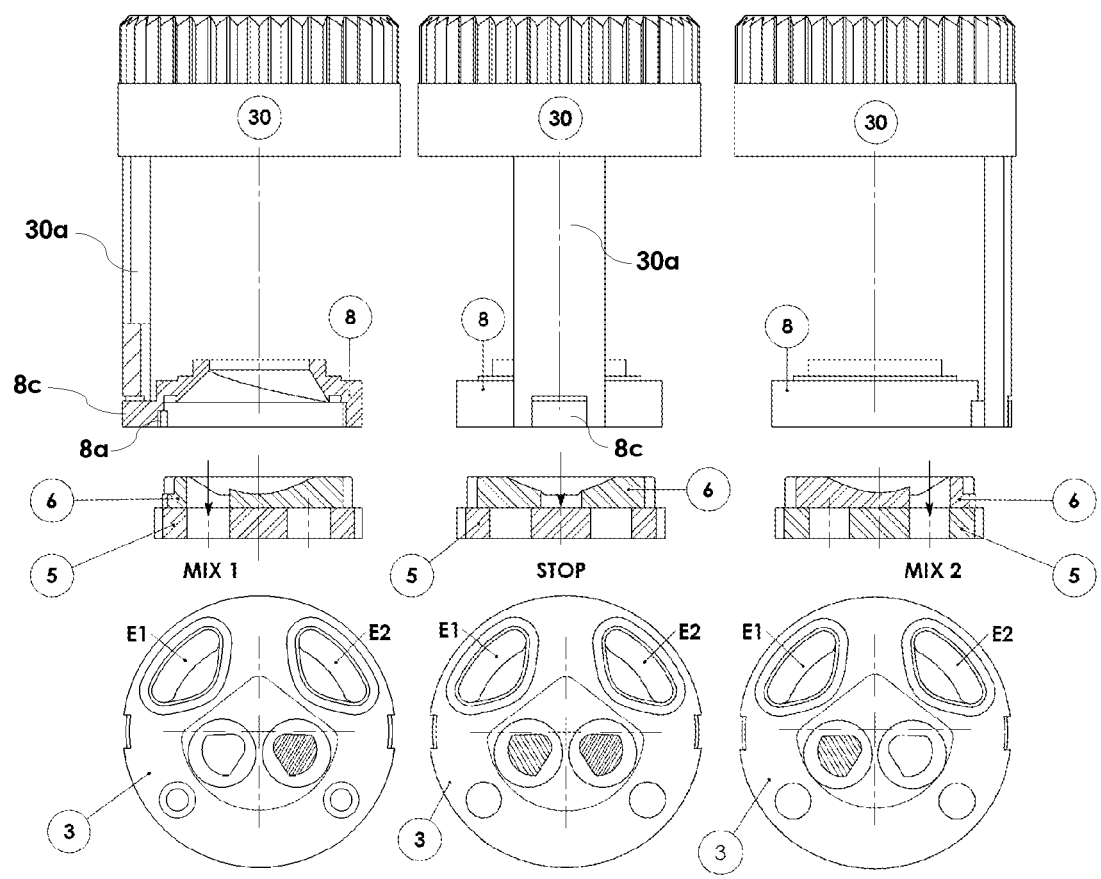
FIGS. 4a-4c are partial sectional and top plan views illustrating the operation of the flow diverter integrated in the valve.

Referring now to FIGS. 4a-4c, the simple and effective operation of the diverter integrated in the valve according to the present invention is readily understood.

In the position of FIG. 4a member 30 is rotated so as to take stem 30a to the left and thus rotate the drawing member 8, through projection 8c, such that the mobile disk 6 is arranged with its opening completely aligned, with the MIX1 outlet. Therefore in the position illustrated in FIG. 4a the flow rate directed towards the MIX1 outlet is maximum, but it is clear that a smaller rotation in said direction allows for a corresponding adjustment of the flow rate.

In the intermediate position of FIG. 4b member 30 is rotated so as to take stem 30a to the center and thus rotate the drawing member 8 such that the mobile disk 6 is arranged with its opening located between the two outlets MIX1 and MIX2 and without any overlapping with them. As a consequence, the outflowing water flow is completely stopped and the valve is closed.

Finally, the position of FIG. 4c is symmetrical with the position of FIG. 4a and corresponds to the maximum flow rate directed towards the MIX2 outlet.

It is clear that the above-described and illustrated embodiment of the valve according to the invention is just an example susceptible of various modifications. In particular, the exact shape of the coupling means between member 30 and the valve group may vary according to need, for example by providing more than one stem 30a and/or the coupling of the latter with the mobile disk 6 if the bottom seat of the cylindrical body 11 is made of wear-resistant material and therefore the drawing member 8 can be dispensed with.

The invention claimed is:

1. Thermostatic mixing valve with integrated flow diverter and extending along a longitudinal axis, said thermostatic mixing valve comprising:
   a first coupling for a control lever for the flow rate adjustment and the flow diversion through a valve group that is housed partly in a base and partly in a cylindrical body, said base being a circular member with oppositely disposed planar surfaces, said cylindrical body being adapted with a planar surface and abutting said base, where said cylindrical body is positioned intermediate said first coupling and said base along said longitudinal axis, and
   a second coupling for a knob for the temperature adjustment through a thermostatic device that is partially housed within said cylindrical body, said second coupling being positioned at an end of said valve whereby said first coupling is positioned intermediate said second coupling and said base along said longitudinal axis,
   wherein said valve group housed partly in said base comprises a fixed lower disk and a mobile upper disk, both of ceramic material, and is located downstream from said thermostatic device with respect to the flow direction of the water through the thermostatic mixing valve such that the valve group is crossed only by mixed water, said base being adapted with two openings for inflow of hot and cold water and adapted with two openings for outflow of mixed water towards two different users, said valve group being adapted to rotate relative to said base thereby blocking and unblocking only said two openings for outflow of mixed water,
   wherein the thermostatic mixing valve includes a member for the transmission of the flow rate adjustment and flow diversion control that directly connects said first coupling for said control lever to said valve group, said transmission member including a vertical stem extending from said first coupling towards said base and passing through said cylindrical body at an axis parallel to said longitudinal axis thereby allowing said first coupling and said valve group to rotate together without moving said cylindrical body.

2. Valve according to claim 1, wherein the cylindrical body is enclosed within an external casing secured to the base and achieves a watertight sealing with said base.

3. Valve according to claim 2, wherein the external casing is secured to the base through at least a pair of tabs extending downwards from the casing and provided with openings that engage corresponding locking teeth formed on the peripheral side of the base.

4. Valve according to claim 1, wherein the mobile upper disk is received in a drawing member with respect to which the mobile upper disk is rotationally restrained, said vertical stem being connected to said drawing member.

5. Valve according to claim 4, wherein said vertical stem is provided at its bottom end with a recess suitable to engage a corresponding projection of the drawing member.

6. Valve according to claim 2, wherein the transmission member is externally fitted over said external casing, which has a slot for the passage of the vertical stem, and is rotatably locked on said external casing by means of a Seeger ring received in a seat formed on the external surface of said external casing.

7. Valve according to claim 1, wherein on top of the cylindrical body there are sequentially arranged a first additional body, comprising a hot water chamber and a supply passage for cold water, as well as a second additional body comprising a cold water chamber, gaskets being received in corresponding seats formed at suitable locations respectively on the top side of the cylindrical body and of said first additional body so as to achieve a static watertight sealing between said two bodies and between the first and second additional bodies.

\* \* \* \* \*